US009551605B2

(12) United States Patent
Ogiwara et al.

(10) Patent No.: US 9,551,605 B2
(45) Date of Patent: Jan. 24, 2017

(54) FUEL-LEVEL MEASURING APPARATUS (71) Applicant: HONDA MOTOR CO., LTD., Tokyo (JP)

(72) Inventors: Naoki Ogiwara, Wako (JP); Masaki Wakao, Wako (JP); Takeshi Watanabe, Wako (JP); Kotaro Tanaka, Wako (JP); Akihiro Taguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 68 days.

(21) Appl. No.: 14/665,651

(22) Filed: Mar. 23, 2015

(65) Prior Publication Data
US 2015/0268083 A1 Sep. 24, 2015

(30) Foreign Application Priority Data

Mar. 24, 2014 (JP) ................. 2014-060025

(51) Int. Cl.
G01F 23/20 (2006.01)
(52) U.S. Cl.
CPC .................... G01F 23/20 (2013.01)
(58) Field of Classification Search
CPC ..................................... G01F 23/20
USPC ............................................. 73/296
See application file for complete search history.

(56) References Cited

U.S. PATENT DOCUMENTS 5,974,873 A * 11/1999 Nelson ................ G01F 22/00
73/149
7,240,549 B2 * 7/2007 Kimbara ............... G01F 23/20
73/296
7,493,834 B2 * 2/2009 Gonzalez Gallegos ............... B66B 1/3484
177/211
2005/0166673 A1 * 8/2005 Kimbara ............... G01F 23/20
73/296
2007/0056779 A1 * 3/2007 Laniado ................. A43C 11/00
177/245
2007/0151773 A1 * 7/2007 Gallegos ............... B66B 1/3484
177/136
2010/0326219 A1 * 12/2010 Nelson ................... B65D 63/00
73/865.8

FOREIGN PATENT DOCUMENTS

DE 10109058 A1 * 9/2002 ............ G01F 23/20
JP 10-260096 A 9/1998
(Continued)

OTHER PUBLICATIONS

Office Action dated Dec. 6, 2016, issued in counterpart Japanese Application No. 2014-060025, with English translation (8 pages).

Primary Examiner — Peter Macchiarolo
Assistant Examiner — Nathaniel Kolb
(74) Attorney, Agent, or Firm — Westerman, Hattori, Daniels & Adrian, LLP (57) ABSTRACT A fuel-level measuring apparatus measures the level of fuel in a vehicle fuel tank. The apparatus can ensure a sufficient capacity of the fuel tank and sense the fuel level even when the fuel tank has a thin or complicated shape. A fuel-level measuring apparatus that senses the level of fuel in a vehicle fuel tank disposed below a floor panel of a vehicle includes a tank band that secures the fuel tank to a body of the vehicle, and a strain gauge attached to the tank band. The fuel level can be obtained from strain in the tank band detected by the strain gauge.

4 Claims, 5 Drawing Sheets (56) References Cited

FOREIGN PATENT DOCUMENTS

| JP | 2005-127171 A | 5/2005 |
|----|---------------|--------|
| JP | 2006-116991 A | 5/2006 |
| JP | 2013-50410 A  | 3/2013 |

\* cited by examiner

FUEL-LEVEL MEASURING APPARATUS

CROSS REFERENCES TO RELATED APPLICATIONS

The present application claims priority under 35 U.S.C. §119 to Japanese Patent Application No. 2014-060025, filed Mar. 24, 2014, entitled "FUEL-LEVEL SENSING APPARATUS." The contents of this application are incorporated herein by reference in their entirety.

BACKGROUND

1. Field

The present application relates to a fuel-level measuring apparatus that measures the fuel level in a fuel tank installed in a vehicle.

2. Description of the Related Art

In a vehicle that uses gasoline or light oil as fuel, it is necessary to indicate the fuel level in a fuel tank so that the driver can know when the tank needs to be refilled and how far the car can drive.

A known fuel-level measuring apparatus that measures the fuel level in a fuel tank is disclosed in, for example, Japanese Unexamined Patent Application Publication No. 2013-50410. The apparatus disclosed therein includes a float provided in a fuel tank, the float moving up and down with the surface level of the fuel, and, by making a float arm of the float slide over a resistor plate and converting the surface level into an electric potential difference, the apparatus measures the height of the surface and indicates the fuel level calculated from the height of the surface to a driver.

However, the technique disclosed in Japanese Unexamined Patent Application Publication No. 2013-50410 has the following problems: because the fuel-level measuring apparatus, such as the float, is disposed in the fuel tank, the capacity of the fuel tank decreases by an amount corresponding to the volume of the fuel-level measuring apparatus; because the fuel-level measuring apparatus needs to be disposed in the fuel tank, the shape of the fuel tank is restricted and cannot be thin or complicated; and, because the surface level of the fuel in the tank changes significantly depending on the orientation and driving conditions of the vehicle, it is impossible to measure the accurate fuel level.

SUMMARY

The present application provides a fuel-level measuring apparatus that can ensure a sufficient capacity of a fuel tank, can accurately measure the fuel level in the fuel tank regardless of the orientation and driving conditions of a vehicle, and can measure the fuel level even when the fuel tank has a thin or complicated shape.

According to a first aspect of the embodiment, a fuel-level measuring apparatus that measures the level of fuel in a vehicle fuel tank disposed below a floor panel of a vehicle includes: a tank band that secures the fuel tank to a body of the vehicle; and a strain gauge attached to the tank band. The fuel level is obtained from strain in the tank band detected by the strain gauge.

According to a second aspect of the embodiment, the tank band is attached along a bottom surface of the fuel tank, an elastic member is disposed between the bottom surface of the fuel tank and a top surface (a first surface) of the tank band, and the strain gauge is attached to a surface of the tank band, at a position immediately below the fuel tank and where the elastic member is not disposed.

According to a third aspect of the embodiment, the tank band has a substantially hat shape in section taken in the longitudinal direction thereof and includes edge portions at both ends in the width direction and a projecting portion projecting toward the fuel tank further than the edge portions. The strain gauge is attached to one of the edge portions in the width direction of the tank band.

According to a fourth aspect of the embodiment, the tank band has a substantially hat shape in section taken in the longitudinal direction thereof and includes edge portions at both ends in the width direction and a projecting portion projecting toward the fuel tank further than the edge portions. The strain gauge is attached to a middle portion of the projecting portion in the longitudinal direction.

According to the first aspect of the embodiment, the fuel tank is disposed below the floor panel, and the tank band for securing the fuel tank to the body receives the total weight of the fuel tank and the fuel in the tank. The strain gauge attached to the tank band detects the strain in the tank band caused by the total weight, and the fuel level in the vehicle fuel tank can be obtained from the detected signal. In this configuration, because the fuel-level measuring apparatus does not need to be disposed in the fuel tank, the fuel tank may have a sufficient capacity. Furthermore, because the design flexibility of the fuel tank increases, the fuel level can be obtained even in fuel tanks incapable of accommodating the fuel-level measuring apparatus, such as those having a thin or complicated shape. Furthermore, because the fuel level is obtained not from the surface level, which is likely to be influenced by the orientation and driving conditions of the vehicle, but from the strain caused by the weight, which is less likely to be influenced by the orientation and driving conditions of the vehicle, the fuel level can be obtained regardless of the orientation and driving conditions of the vehicle.

According to the second aspect of the embodiment, the tank band is attached along the bottom surface of the fuel tank, an elastic member is disposed between the bottom surface of the fuel tank and the top surface of the tank band, and the strain gauge is attached to the side edge surface (a second surface) of the tank band, at a position immediately below the fuel tank and where the elastic member is not disposed. Because the elastic member disposed between the fuel tank and the tank band serves as a cushioning member, the elastic member can reliably receive the load applied to the tank band and appropriately support the fuel tank. In particular, because the fuel tank does not move away from the tank band and is kept supported by the tank band even when a large load is applied thereto, such as when the vehicle drives over a bump, the strain in the tank band caused by the load applied by the fuel tank can be constantly measured with the strain gauge attached thereto, and the fuel level can be obtained.

According to the third aspect of the embodiment, the tank band has a substantially hat shape in section taken in the longitudinal direction thereof and includes edge portions at both ends in the width direction and a projecting portion projecting toward the fuel tank further than the edge portions. The strain gauge is attached to one of the edge portions in the width direction of the tank band. Thus, the elastic member and the strain gauge can be efficiently disposed on the tank band. Furthermore, because the strain gauge is disposed on the surface of the tank band adjacent to the fuel tank, there is less possibility of an object, such as a stone on a road, hitting the strain gauge while the vehicle is driving, and hence, it is possible to protect the strain gauge.

According to the fourth aspect of the embodiment, the tank band has a substantially hat shape in section taken in the longitudinal direction thereof and includes edge portions at both ends in the width direction and a projecting portion provided therebetween and projecting toward the fuel tank further than the edge portions. The strain gauge is attached to a middle portion of the projecting portion in the longitudinal direction. Because this portion is more sensitive to a change in load due to an increase or decrease in fuel level in the fuel tank than the other portions, an obvious change in load occurs in this part. Hence, the strain gauge attached to this part can detect an obvious change in strain in the tank band due to an increase or decrease in fuel level, compared with a strain gauge attached to another part, making it possible to obtain the fuel level.

DESCRIPTION OF THE PREFERRED EMBODIMENTS

Figure 1A:
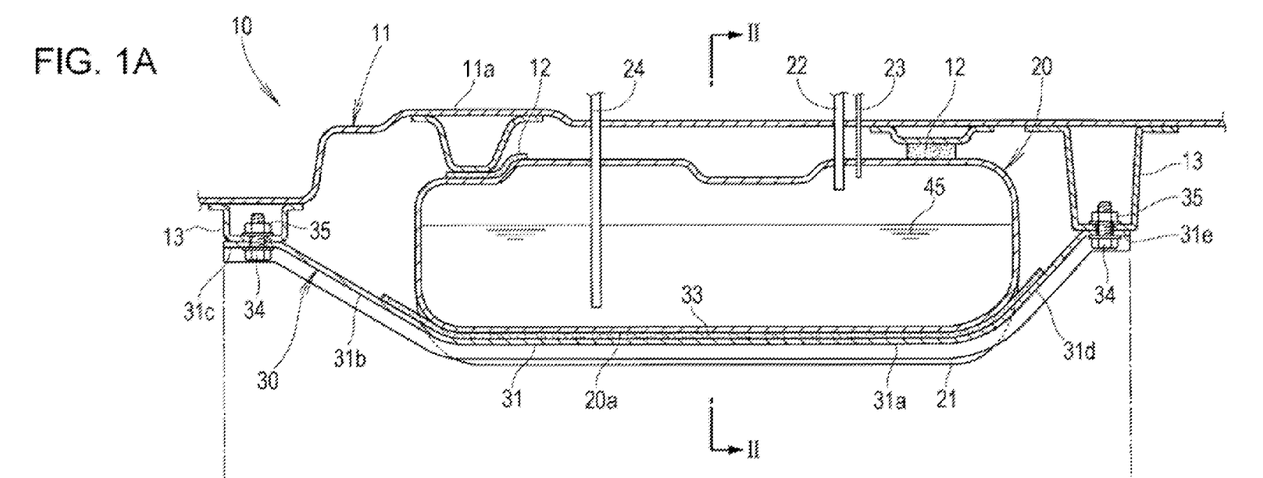
FIG. 1A is a sectional view of a configuration in which a fuel tank provided with a fuel level measuring apparatus according to one embodiment of the present application is disposed below a floor panel, as viewed from the center of the vehicle's width.
Figure 1B:
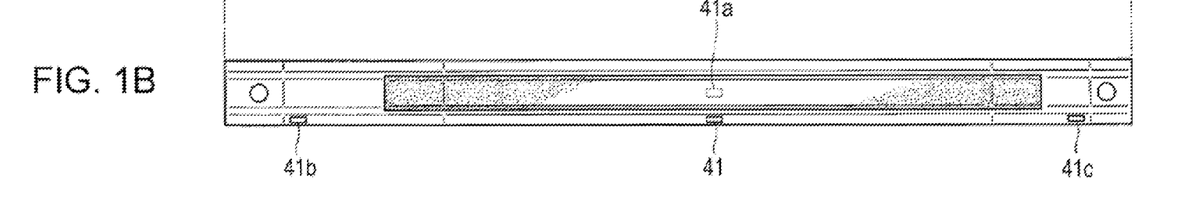
FIG. 1B is a plan view of a tank band.

An embodiment of the present application will be described with reference to the attached drawings. Embodiment First, the configuration of the present application will be described with reference to FIGS. 1 to 3. In these drawings, "Fr" denotes the front side, "Rr" denotes the rear side, "Le" denotes the left side, and "Ri" denotes the right side of a vehicle 10. FIG. 1A is a sectional view of a configuration in which a fuel tank 20 of the present application is disposed below a floor panel 11a, as viewed from the center of the vehicle's width, and FIG. 1B is a plan view of a tank band 30 that is used to secure the fuel tank 20 to a body 11. The fuel tank 20 is disposed below the floor panel 11a of the body 11 of the vehicle 10, such as a passenger car, a bus, or a truck. Cushioning members 12 formed of rubber, flexible resin, or the like are disposed between the floor panel 11a and the fuel tank 20. The body 11 includes cross members 13 extending below the floor panel 11a. The fuel tank 20 is supported by two tank bands 30, whose ends are fixed to the cross members 13 of the body of the vehicle 10. Each of the tank bands 30 is formed in an elongated shape having its longitudinal direction and certain width in its width direction perpendicular to the longitudinal direction.

The fuel tank 20 is formed as a single component of synthetic resin. Alternatively, the fuel tank 20 may be formed by joining an upper tank portion, which is formed of a steel plate or synthetic resin, and a lower tank portion, which is also formed of a steel plate or synthetic resin, at flanges provided along the outer circumference thereof, by using adhesive or a bolt and nut.

The fuel tank 20 has, in a bottom surface 20a thereof, two (right and left) tank-band fitting grooves 21 to which the two (right and left) tank bands 30, extending in the front-rear direction of the vehicle 10, are fitted. Furthermore, a fuel supply pipe 22 through which fuel is supplied from a fuel supply port (not shown) of the vehicle 10 to the fuel tank 20; an air-bleeding pipe 23; and a fuel supply pipe 24 through which the fuel is supplied from the fuel tank 20 to an engine (not shown) by means of a fuel pump (not shown) are provided in the top surface of the fuel tank 20.

Figure 2:
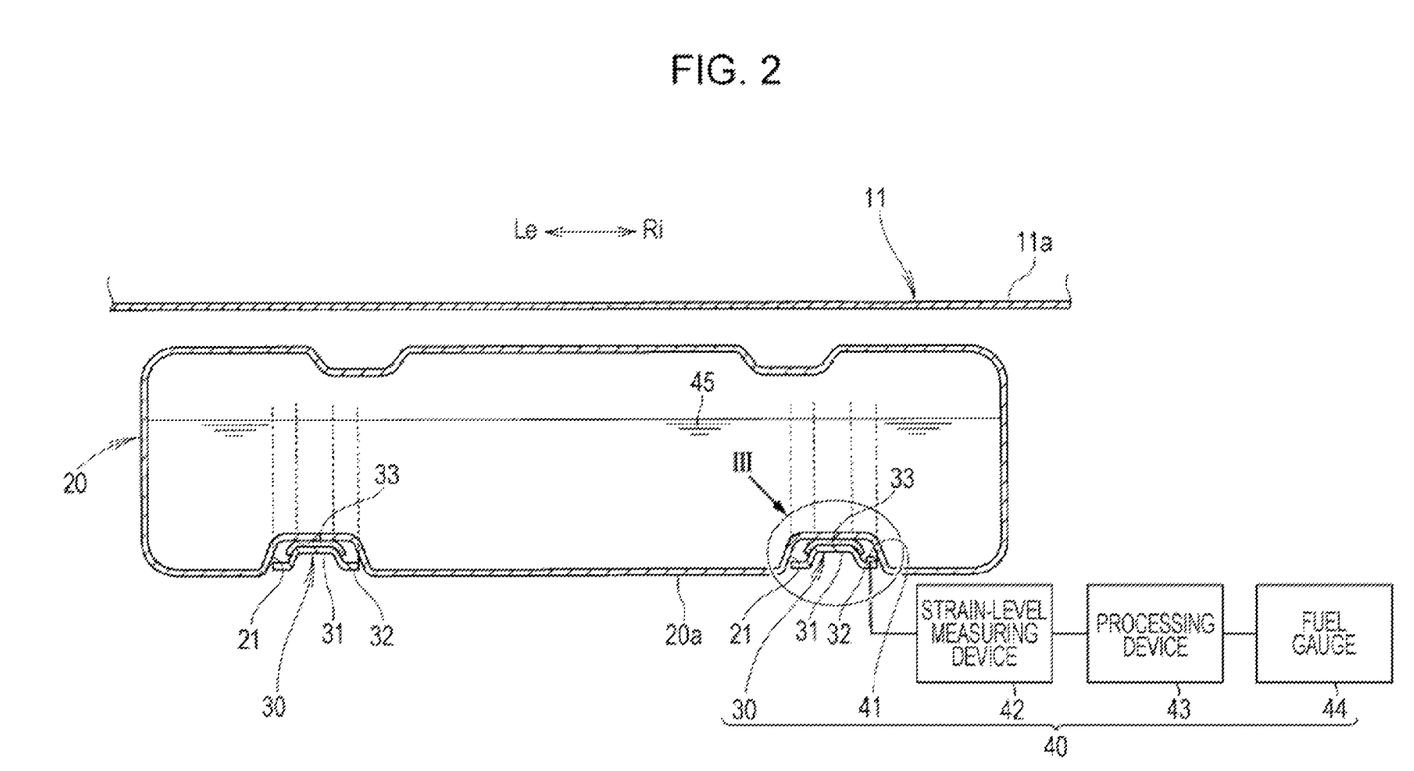
FIG. 2 is a sectional view taken along line II-II in FIG. 1A.

The right and left tank bands 30 are formed of bent steel plates, and each tank band 30 has a projecting portion 31 that is provided at a middle portion, in the longitudinal direction, of the top surface (the surface facing the fuel tank 20) so as to extend over the entire length, as viewed in section taken in the longitudinal direction of the tank bands 30. The tank band also has edge portions 32 formed on both sides of the projecting portion 31. In other words, the tank bands 30 have a substantially hat shape in sectional view.

Each projecting portion 31 includes, in the longitudinal direction of the tank band 30, a horizontal portion 31a extending in the front-rear direction of the vehicle 10; a front attaching portion 31c formed on the front side of the horizontal portion 31a; a front slope portion 31b formed between the horizontal portion 31a and the front attaching portion 31c; a rear attaching portion 31e formed on the rear side of the horizontal portion 31a; and a rear slope portion 31d formed between the horizontal portion 31a and the rear attaching portion 31e.

Figure 3:
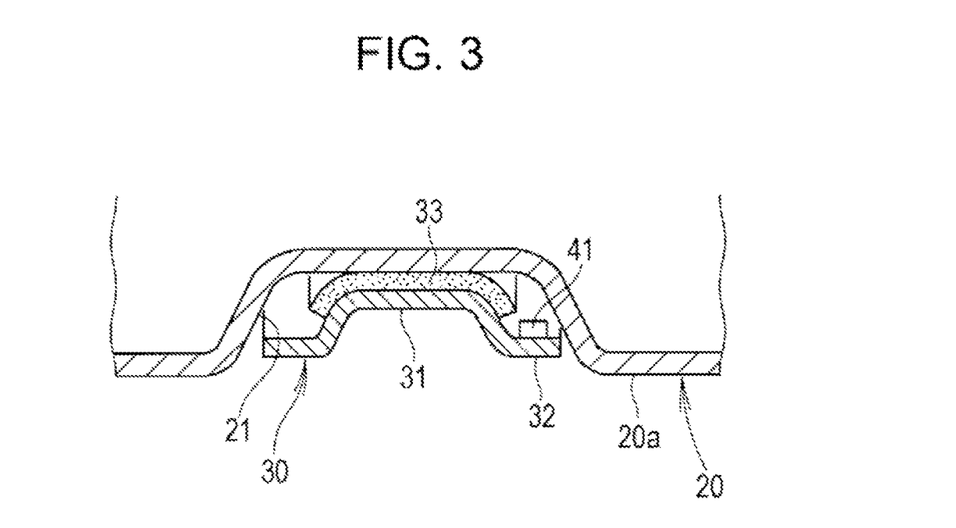
FIG. 3 is an enlarged view of portion III indicated in FIG. 2.

An elastic member 33 formed of rubber, flexible resin, or the like is bonded, with adhesive, to a portion of the projecting portion 31, the portion including the entire horizontal portion 31a and the top surfaces, near the horizontal portion 31a, of the front slope portion 31b and rear slope portion 31d.

The fuel tank 20 is disposed at a predetermined position below the floor panel 11a, and the top surfaces of the elastic members 33 on the right and left tank bands 30 are fitted to the right and left tank-band fitting grooves 21. The right and left tank bands 30 each have one front attachment hole in the front attaching portion 31c and one rear attachment hole in the rear attaching portion 31e. Support bolts 34 are inserted into the attachment holes, and screw portions of the support bolts 34 are made to pass through holes provided in the cross members 13 of the body 11 of the vehicle 10. Then, the support bolts 34 are fastened with tank-attaching nuts 35. In this way, the fuel tank 20 disposed below the floor panel 11a is fixed to the body 11 and supported by the right and left tank bands 30.

The fuel tank 20 may be entirely or partially (i.e., only at the bottom surface 20a) covered with a metal or resin cover, with a rubber or flexible resin layer therebetween, for protection from stones etc. In such a case, grooves to which the right and left tank bands are fitted are provided in the bottom surface of the cover, so that they serve the same function as the tank-band fitting grooves 21 in the fuel tank 20.

A strain gauge 41 is attached to the side edge 32 of the projecting portion 31 of one of the right and left tank bands 30, at the middle (center) position in the longitudinal direction. Although one strain gauge 41 is enough, more than one strain gauge 41 may be provided in case of fault or damage. Furthermore, the strain gauge 41 may be attached to the back surface of the edge 32.

The strain gauge 41 is bonded to the edge 32 of the tank band 30 with adhesive such that the longitudinal directions of the strain gauge 41 and tank band 30 are parallel to each other. The top surface of the strain gauge 41 may be covered with a protection member formed of rubber, resin, or the like.

A gauge lead wire extending from the strain gauge 41 is connected to a strain-level measuring device 42 that detects the strain in the tank bands 30 and is formed of a power supply circuit, a bridge circuit, and an amplifier. The strain-level measuring device 42 is installed somewhere in the vehicle 10, but not on the fuel tank 20.

The strain-level measuring device 42 is connected to a processing device 43 that calculates the weight of the fuel 45 from the strain in the tank bands 30 and, moreover, calculates the level of the fuel 45 from the weight of the fuel 45. The processing device 43 is installed somewhere in the vehicle 10, but not on the fuel tank 20.

The processing device 43 is disposed in an instrument panel provided at a driver's seat to indicate the results obtained by the processing device 43 and is connected to a fuel gauge 44 that indicates, using a needle or a bar graph, the level of the fuel 45 in the form of ratio to the capacity of the fuel tank 20 (i.e., from a full state to an empty state).

As described above, the fuel-level measuring apparatus 40 of the present application includes the tank bands 30, the strain gauge 41, the strain-level measuring device 42, the processing device 43, and the fuel gauge 44.

Next, a method of how the fuel-level measuring apparatus 40 calculates the level of the fuel 45 in the fuel tank 20 from the strain in the tank bands 30 detected by the strain gauge 41 will be described.

Many metals experience expansion or contraction, which is minimal mechanical change, when a force is applied thereto (such expansion and contraction are generally called "strain"). The strain changes the electrical resistance of the metal. The strain gauge 41 and the strain-level measuring device 42 to which the strain gauge 41 is connected are sensors that detect, as an electric signal, the "strain" caused by a force applied to the metal. The strain and the electrical resistance are proportional to each other by a constant called "resistance change rate", and the resistance change rate is determined by a passive component. Hence, the force (i.e., load) causing the strain can be obtained by multiplying the detected strain by the resistance change rate of the passive component of the strain gauge 41. The present application provides a fuel-level detecting apparatus that obtains the level of the fuel 45 in the fuel tank 20 by detecting, with the strain gauge 41, the strain in the tank bands 30 that support the fuel tank 20.

Fuel is supplied from the fuel supply port (not shown) in the vehicle 10 to the fuel tank 20 through the fuel supply pipe 22. The fuel supplied to the fuel tank 20 is supplied to the engine (not shown) through the fuel supply pipe 24 by the fuel pump (not shown).

When the level of the fuel 45 in the fuel tank 20 is increased by supplying fuel, the total weight of the fuel tank 20 (i.e., the sum of the weight of the fuel tank 20 and the weight of the fuel 45) increases. On the other hand, when the level of the fuel 45 is decreased by the engine consuming the fuel during driving, the total weight of the fuel tank 20 decreases. In short, the total weight of the fuel tank 20 increases or decreases in proportion to an increase or decrease in level of the fuel 45.

Because the fuel tank 20 supported by the tank bands 30 at the bottom surface 20a thereof is disposed below the floor panel 11a of the vehicle 10 and is fixed to the body 11, the tank bands 30 are subjected to the total weight of the fuel tank 20. Hence, the strain due to the load (i.e., the total weight of the fuel tank 20) occurs in the tank bands 30. A material of the tank bands 30 may be selected from any types including resins, metals and the like as known in the art, which have proper strain characteristics to allow the strain gauge 41 mechanically connected to the bands to convert the strain of the tank bands to electric signals, in responding to the total weight of the fuel tank 20.

When the load applied to the tank bands 30 increases as the level of the fuel 45 in the fuel tank 20 increases, the surfaces of the tank bands 30 adjacent to the fuel tank 20 expand at the projecting portions 31 and the periphery thereof and contract at the front slope portions 31b and rear slope portions 31c of the projecting portions 31.

Figure 4:
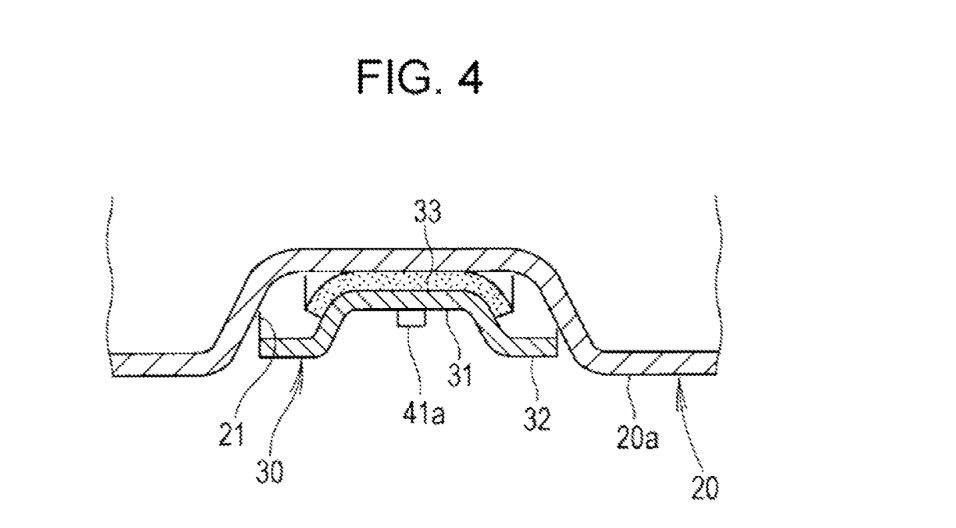
FIG. 4 is an enlarged sectional view of the vicinity of a strain gauge attached to a middle portion, in the longitudinal direction, of a projecting portion of the tank band shown in FIG. 1.
Figure 5:
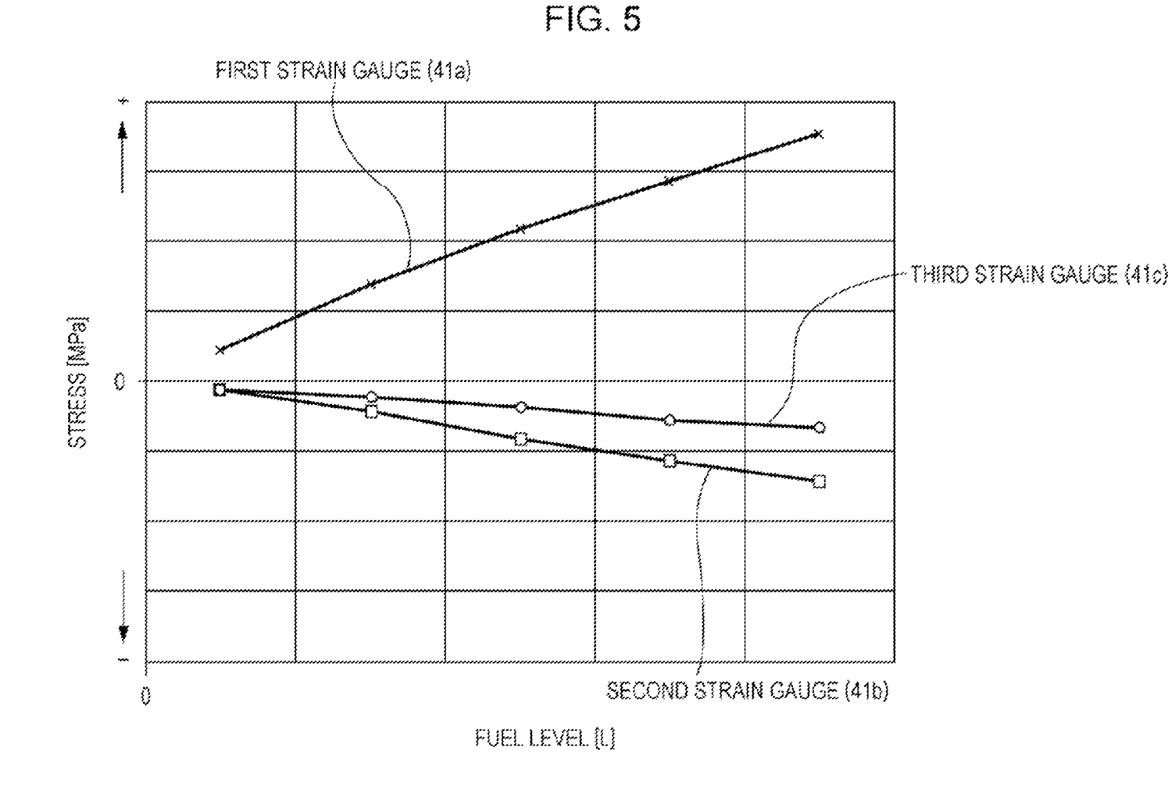
FIG. 5 is a graph showing the relationship between the fuel level and the stress.

For verification, three strain gauges were attached to the tank band 30 supporting the fuel tank 20, as shown in the plan view in FIG. 1B, and the values detected by the strain gauges while the fuel was supplied were recorded and compared. The stresses (MPa) corresponding to the level of the fuel 45 (L) detected by a first strain gauge (41a) (see FIG. 4) attached to a middle portion of the projecting portion 31 in the longitudinal direction, a second strain gauge (41b) attached to an edge of the front slope portion 31b of the tank band 30, and a third strain gauge (41c) attached to an edge of the rear slope portion 31d of the tank band 30 are plotted on the graph in FIG. 5. As shown in FIG. 5, in each strain gauge, the detected stress increases (or decreases in the case of minus) linearly as the fuel level increases. Thus, there is a linear relationship between the fuel level and the stress. Meanwhile, the stress detected by the first strain gauge was about three to five times those detected by the second and third strain gauges for the same level of the fuel 45. This shows that the first strain gauge (41a) can detect the stress applied to the tank band due to an increase in the level of the fuel 45 in a greater magnitude than the other strain gauges. Accordingly, it may be considered that the strain gauge (41a) attached to the middle portion of the projecting portion 31 of the tank band 30 in the longitudinal direction can most precisely detect the level of the fuel 45.

Hence, the strain gauge 41 attached to the edge 32 of the tank band 30 and the strain gauge 41a attached to the middle portion of the projecting portion 31 of the tank band 30 in the longitudinal direction detect the strain (expansion) in the tank band 30 when the load applied to the tank band 30 increases as the level of the fuel 45 increases and detect a decrease in strain due to the expanded tank band 30 returning to the original state when the load applied to the tank band 30 decreases as the level of the fuel 45 decreases.

The strain gauge 41 detects the strain occurring in the tank band 30 as an electric signal and transmits the electric signal.

The strain-level measuring device 42 calculates the strain in the tank bands 30 from the electric signal received from the strain gauge 41 and sends data about the strain level to the processing device 43.

The processing device 43 calculates the level of the fuel 45 from the strain data received from the strain-level measuring device 42, using a predetermined arithmetic expression, a map, or the like.

When the fuel tank 20 is filled with the fuel 45 to the limit of its capacity, the total weight of the fuel tank 20 is equal to the sum of the weight of the fuel tank 20 and the weight of the fuel 45 that fills the fuel tank 20 to the limit of its capacity, and at this time, the load applied to the tank bands 30 is maximum. The level of the fuel 45 calculated by the processing device 43 from the electric signal generated by the strain occurring at this time is regarded as the limit of the capacity of the fuel tank 20, and at this time, the needle of the fuel gauge 44 points to "F", indicating a full tank.

Furthermore, when the level of the fuel 45 in the fuel tank 20 is zero, the total weight of the fuel tank 20 is equal to the weight of the fuel tank 20, and at this time, the load applied to the tank bands 30 is minimum. The level of the fuel 45 calculated by the processing device 43 from the electric signal generated by the strain occurring at this time is regarded as zero, and at this time, the needle of the fuel gauge 44 points to "E", indicating "empty tank".

The fuel gauge 44 indicates the level of the fuel 45, which is provided by the processing device 43, in the form of ratio to the capacity of the fuel tank 20 (i.e., full, ¾ full, ½ full, ¼ full, and empty), using a scale and needle, a bar graph, or the like.

The present application is suitable for various types of vehicle including cars, such as passenger cars, freight cars, and buses, and diesel electric locomotives that use gasoline or light oil as fuel and have a fuel tank disposed and fixed below the floor panel of the vehicle.

Figure 6:
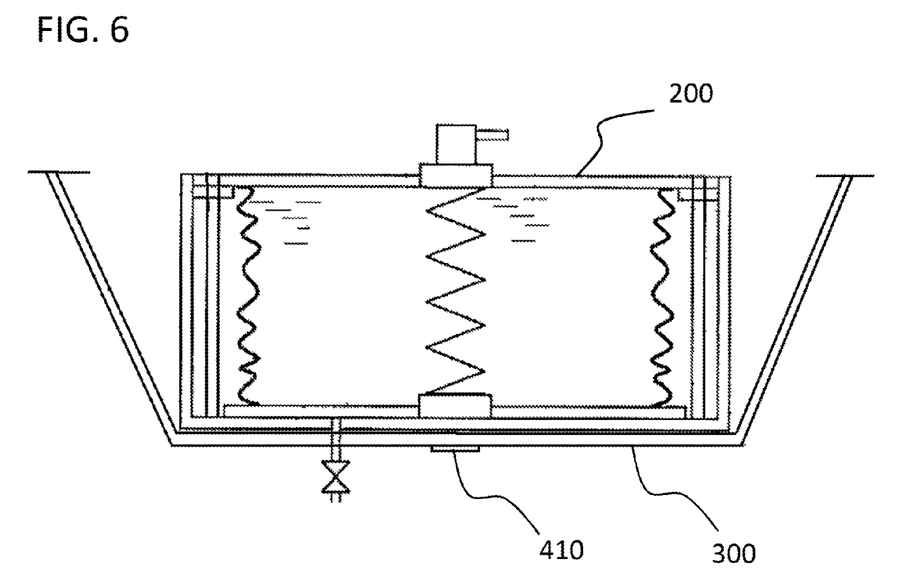
FIG. 6 is a sectional view of another type of fuel tank provided with a fuel level measuring apparatus according to the embodiment of the present invention.

FIG. 6 is a schematic view of another type of fuel tank provided with a fuel level measuring device according to the embodiment of the present invention as shown above. This fuel tank 200 has an elastic or flexible (expandable and retractable) body the inside of which is filled with a fuel. The tank body 200 is configured to expand to charge the fuel inside and shrink to discharge the fuel therefrom, responding to the change of the remaining amount (level) of fuel. The fuel tank body 200 secures the tank body to a vehicle body (not shown). As shown in FIG. 6, a tank band 300 may be provided to support and hold the body of the tank 200 in a manner similar to FIG. 1. A strain gauge 410 may typically be attached to the tank band 300 at a middle position thereof in the longitudinal direction. However, the position of the gauge 410 is not limited and may be selected from any other places as shown in FIGS. 1-4. Any aspects and features discussed for the tank band and the gauge in the present application may be applied to this type of fuel tank.

As shown above, the fuel level measuring apparatus according to embodiments of the present invention can be mounted to the outside of the tank body by utilizing a tank band or any such supporting structure designed to hold the tank body, without a necessity of a float or other level detecting devices provided typically inside the tank body. Accordingly, this feature of the invention allows even any types of fuel tanks to easily measure the fuel level, with the tank band and the strain gauge according to the present invention, even in a case where they have no space or a limited space inside the tank for detecting the level of fuel.

What is claimed is:

1. A fuel-level measuring apparatus for measuring a level of fuel in a vehicle fuel tank disposed below a floor panel of a vehicle, the apparatus comprising:
   a tank band that secures the fuel tank to a body of the vehicle in a manner that receives a weight of the fuel tank;
   a strain gauge attached to the tank band to detect strain of the tank band; and
   a measuring device configured to determine the fuel level based on the strain detected by the strain gauge.

2. The apparatus according to claim 1, further comprising an elastic member, wherein
   the tank band has a first surface for supporting a bottom surface of the fuel tank and a second surface that is located immediately below the bottom surface of the fuel tank and does not contact the bottom surface, and
   the elastic member is disposed between the bottom surface of the fuel tank and the first surface of the tank band, and
   the strain gauge is attached to the second surface of the tank band.

3. The apparatus according to claim 2, wherein the tank band is formed in an elongated shape having a middle portion having the first surface and side edge portions having the second surface, each of the middle and side edge portions extending along a longitudinal direction of the tank band, the tank band having a substantially hat shape in a cross-section of its width direction such that the edge portions are formed at both sides of the middle portion and the middle portion projects toward the fuel tank from each side edge portion in the width direction, and
   the strain gauge is attached to the second surface of one of the side edge portions on a side adjacent to the fuel tank.

4. The apparatus according to claim 2, wherein
   the tank band is formed in an elongated shape having a middle portion having the first surface and side edge portions having the second surface, each of the middle and side edge portions extending along a longitudinal direction of the tank band, the tank band having a substantially hat shape in a cross-section of its width direction such that the edge portions are formed at both sides of the middle portion and the middle portion projects toward the fuel tank from each side edge portion in the width direction, and
   the strain gauge is attached to the projected middle portion of the tank band at a middle position in the longitudinal direction.

* * * * *